Jan. 17, 1967 K. F. READ ET AL 3,299,300

OSCILLATOR OVEN

Filed July 24, 1963 6 Sheets-Sheet 1

Kenneth F. Read
J. Barry Oakes
Paul E. P. White
Theodore Wyatt
INVENTORS

BY

Claude Funkhouser
ATTORNEY

OSCILLATOR OVEN

Filed July 24, 1963

Kenneth F. Read
J. Barry Oakes
Paul E. P. White
Theodore Wyatt
INVENTORS

BY

Claude Funkhouser
ATTORNEY

OSCILLATOR OVEN

Filed July 24, 1963 6 Sheets-Sheet 3

Kenneth F. Read
J. Barry Oakes
Paul E. P. White
Theodore Wyatt
INVENTORS

BY

Claude Funkhouser
ATTORNEY

Kenneth F. Read
J. Barry Oakes
Paul E. P. White
Theodore Wyatt
INVENTORS

BY

Claude Funkhouser
ATTORNEY

Jan. 17, 1967 K. F. READ ETAL 3,299,300

OSCILLATOR OVEN

Filed July 24, 1963 6 Sheets-Sheet 5

Kenneth F. Read
J. Barry Oakes
Paul E. P. White
Theodore Wyatt
INVENTORS

BY

Claude Funkhouser
ATTORNEY

Kenneth F. Read
J. Barry Oakes
Paul E. P. White
Theodore Wyatt
INVENTORS

BY
Claude Funkhouser
ATTORNEY

United States Patent Office 3,299,300
Patented Jan. 17, 1967

3,299,300
OSCILLATOR OVEN

Kenneth F. Read, Bowie, and J. Barry Oakes, Paul E. P. White, and Theodore Wyatt, Silver Spring, Md., assignors to the United States of America as represented by the Secretary of the Navy
Filed July 24, 1963, Ser. No. 297,471
9 Claims. (Cl. 310—8.9)

This invention relates in general to crystal oscillator ovens and, more particularly, to an improved oscillator oven utilizing a lightweight multicasing insulation technique.

The frequency standard used in most satellites is a crystal oscillator. This oscillator provides the basic timing frequency for all the diverse electronic circuitry contained in the satellite. In order to provide for the stable operation of this circiutry, it is necessary to furnish temperature control to the oscillator. That is, its rate of oscillation must not fluctuate with slight temperature variations, which variations are external of the crystal. Additionally, in a satellite navigation system it is imperative to use only a frequency standard that has a stability of a few parts in $10^9$ over a fifteen minute period. However, this stability is only obtainable if the external temperature variations to which the satellite is exposed, when orbiting partly in shadow and partly in full sunlight, is not transferred to the crystal. The temperature variations caused by orbiting from shadow to sunlight are effectively dampened to a change of ±0.005° F. by the instant invention which holds the frequency standard.

Other problems are encountered in the design of a crystal oscillator oven suitable for use in a space environment. First, there is a limitation as to its allowable weight. Second, the size of the oven must be kept small and compact. Also, heat dissipation calculations must be considered before determining the amount of insulation to be placed around the sensitive crystal. If too much insulation is provided, the internally generated heat can not dissipate and therefore the internal temperature continuously rises until the device becomes inoperative.

Two different approaches are possible when attempting to design an active crystal oven for use in a space environment. The first of these is a proportional type oven, and the second is a thermostatically controlled on-off type oven with a thermal lag.

In a proportional type oven the crystal container is maintained at a fixed temperature by a continuously activated heat source, which is in intimate contact with the crystal container. In this instance, the amount of heat generated by the heat source is continuously changing under the direction of an oven control circuit. This circuit includes a transformer coupled power oscillator, which drives a resistance bridge, and a phase detector. Three legs of the bridge contain low temperature coefficient resistors, while the fourth includes a thermistor having a relatively high temperature coefficient. As the bridge approaches balance, its output approaches zero, and on the other side of balance the output rises again but with a reversed phase. The output of the bridge is amplified and applied to the terminals of the phase detector whose reference is the original power oscillator. The output of the detector controls the dissipation of a power transistor thermally connected to the innermost cylinder holding the crystal, which transistor maintains the innermost cylinder at the desired constant temperature. This innermost cylinder is mounted within a larger mounting cylinder and separaetd therefrom by an insulation layer. The thickness of this layer is chosen so that, should the control circuitry fail, the stability of the oscillator would revert to that of an inactive oven, that is, to a thermally balanced oven where the internally generated heat is sufficient to maintain the desired temperature and to satisfy the insulation dissipation capacity surrounding the crystal.

The thermostatically controlled on-off oven is based on the concept of locating a thermostat so as to control the temperature at a point outward from the innermost thermal container. In this instance, insulation is placed on both the outward side and the inward side from the controlled point. Insulation outward from this point keeps the heat dissipation low, while insulation between the controlled point and the crystal is employed to damp out the thermal transients caused by the on-off thermostat operation.

One object of the present invention, therefore, resides in the provision of a lightweight oscillator oven utilizing a thermostatically controlled on-off technique to maintain a near constant temperature at the crystal.

Another object of the invention is to provide a reliable oscillator oven for use in a space environment, which oven employs thin wall multiple containers.

A further object of the invention is to provide a proportional crystal oscillator oven which employs a thin wall container, and the multicasing insulation technique.

A still further object of the invention is to reduce the internal temperature variations of the crystal oscillator oven by utilizing a multicasing insulation technique, and a thermally capacitive inner container.

Other objects and many of the attendant advantages of this invention will be readily appreciated as the same becomes better understood by reference to the following detailed description when considered in connection with the accompanying drawings, wherein.

Figures 2, 3, 4:
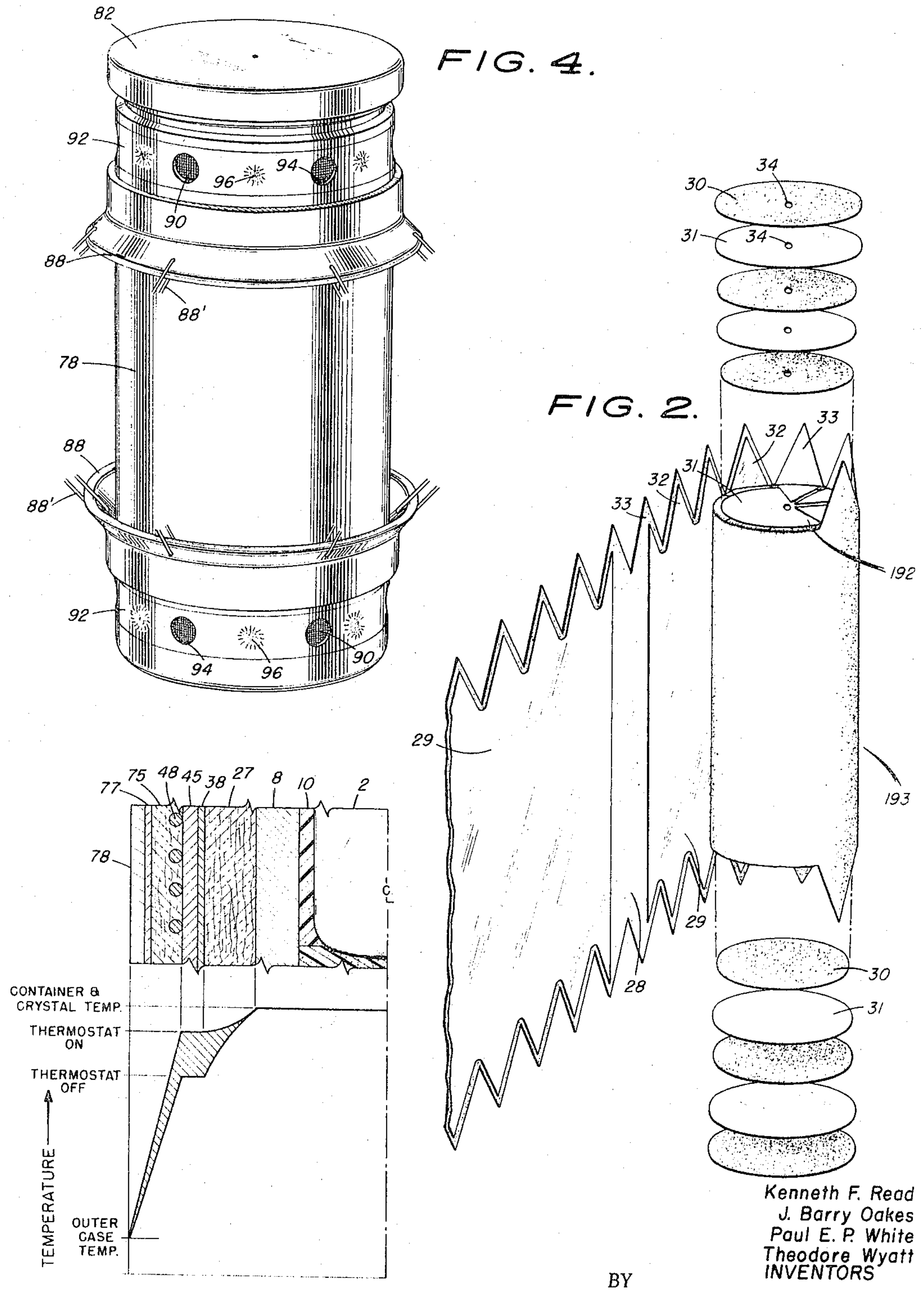
FIG. 2 is an exploded perspective showing the method of mounting the multicasing insulation in the instant invention.
Figure 5:
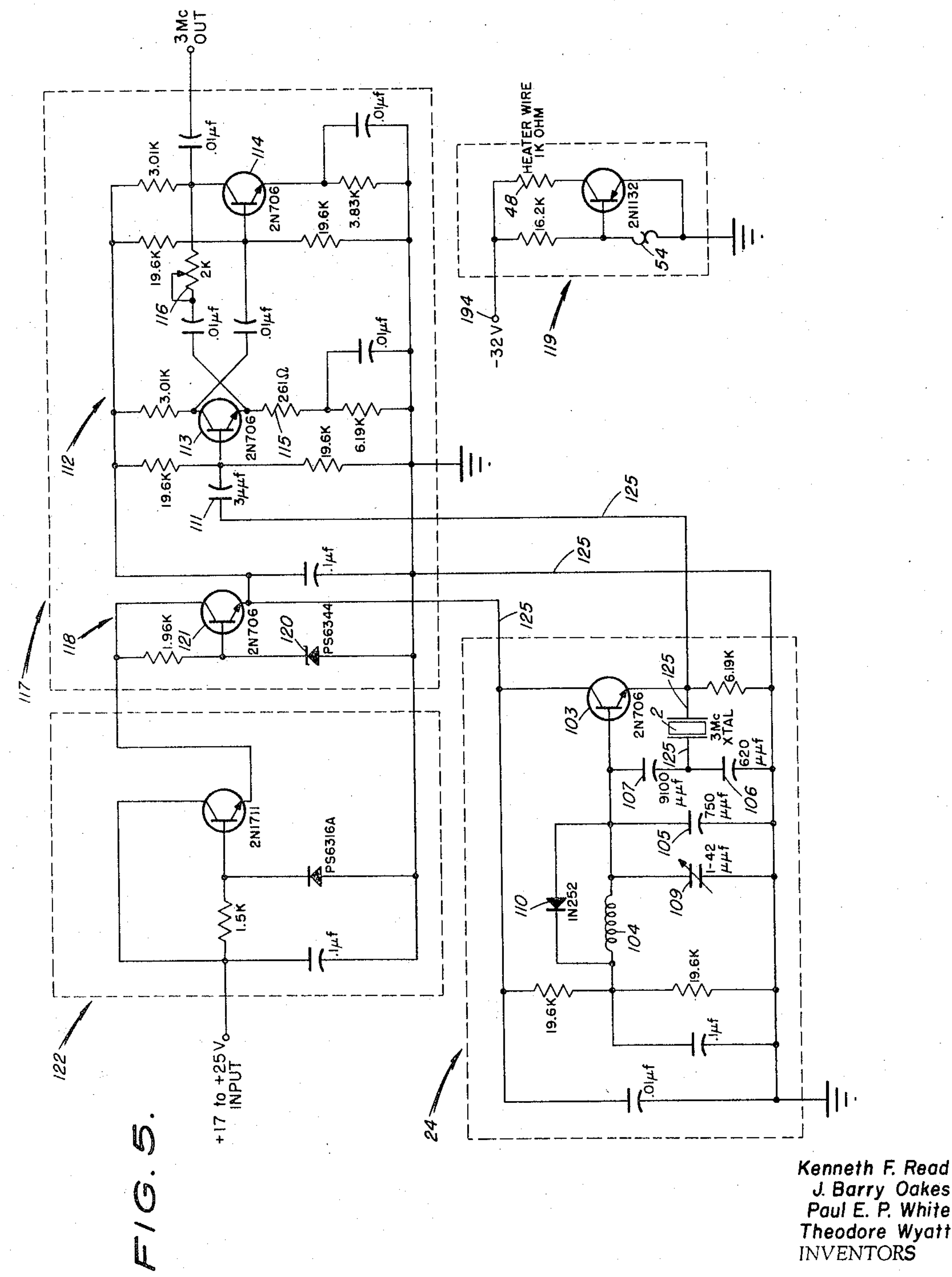
Figures 6, 7:
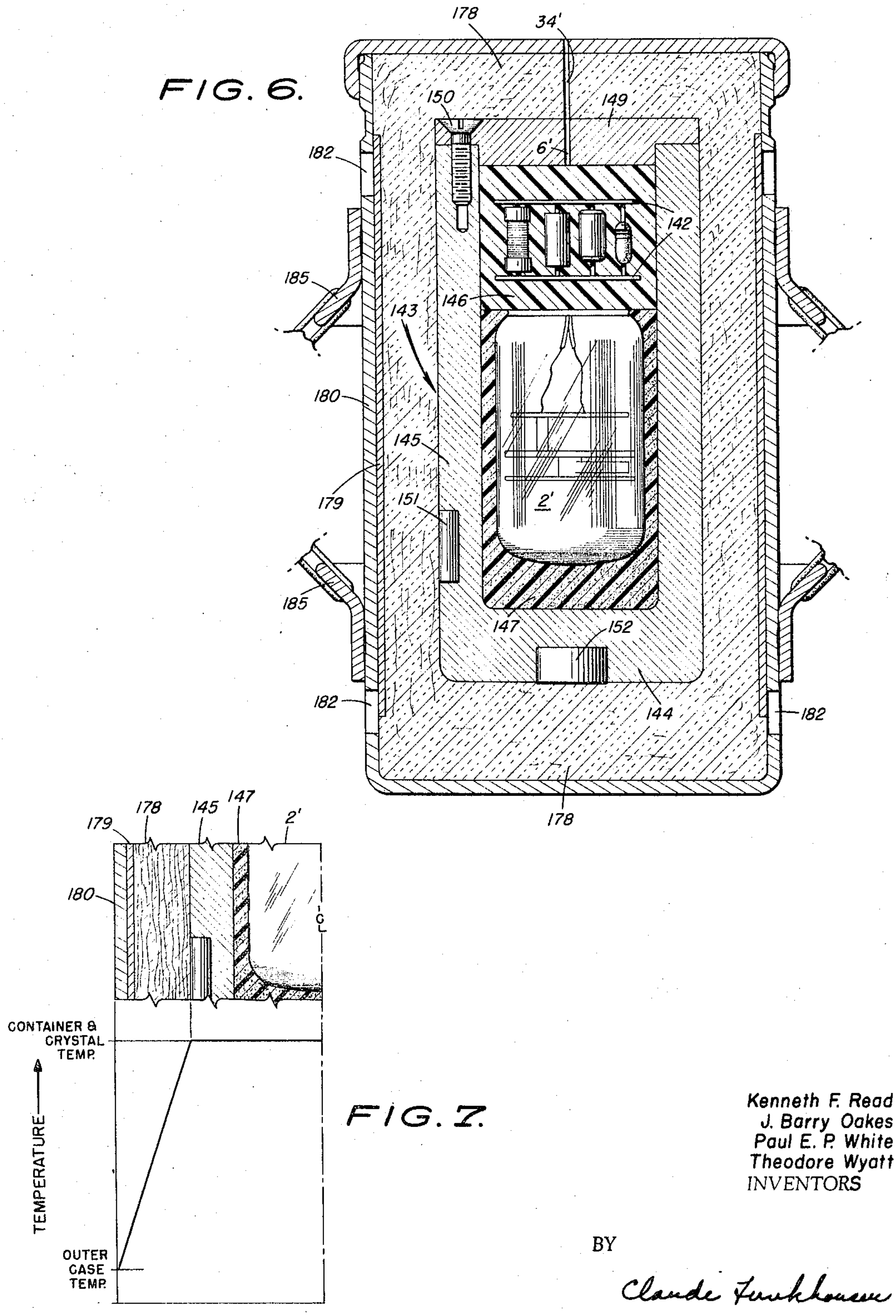
Figure 8:
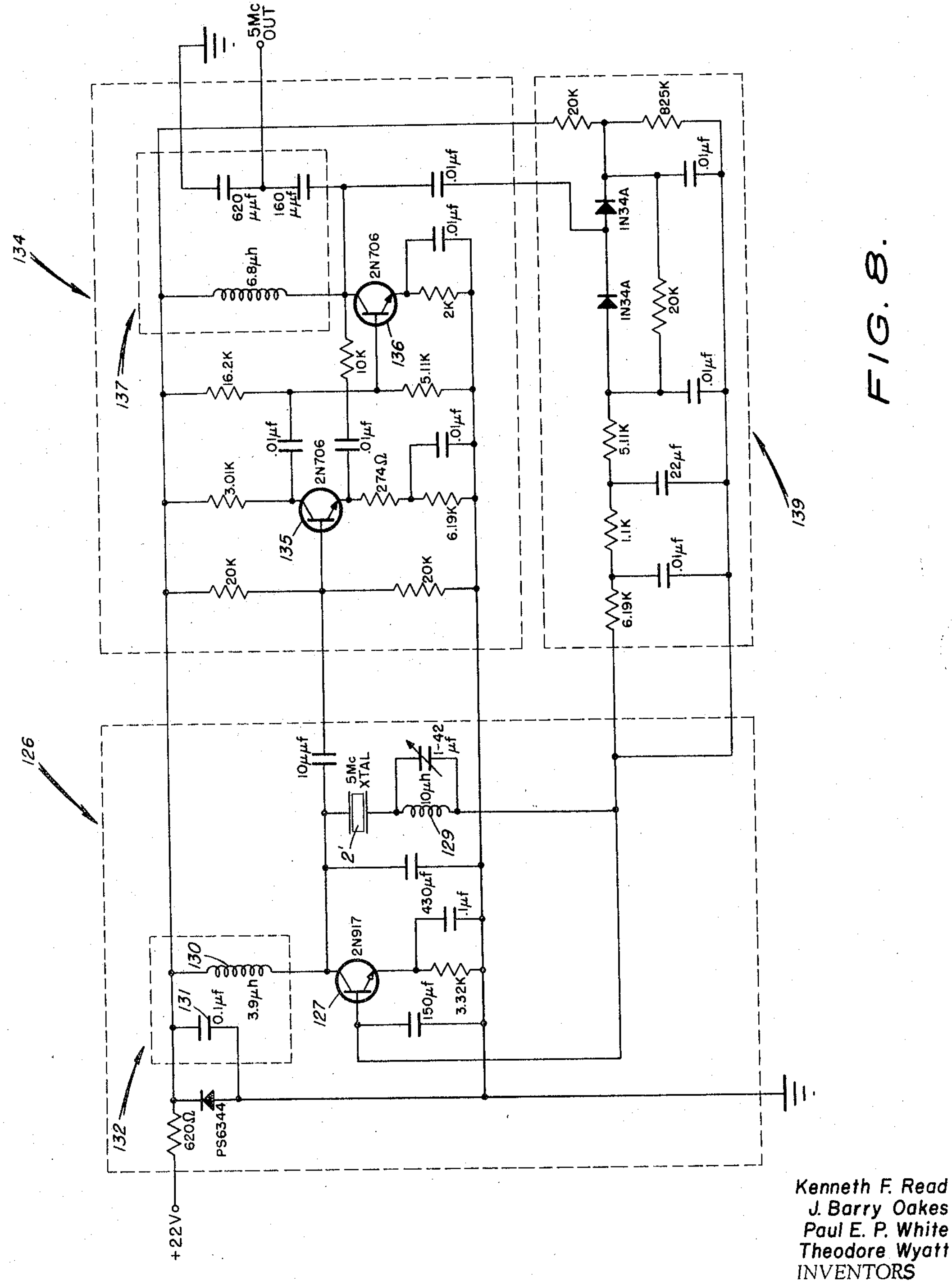
Figure 9:
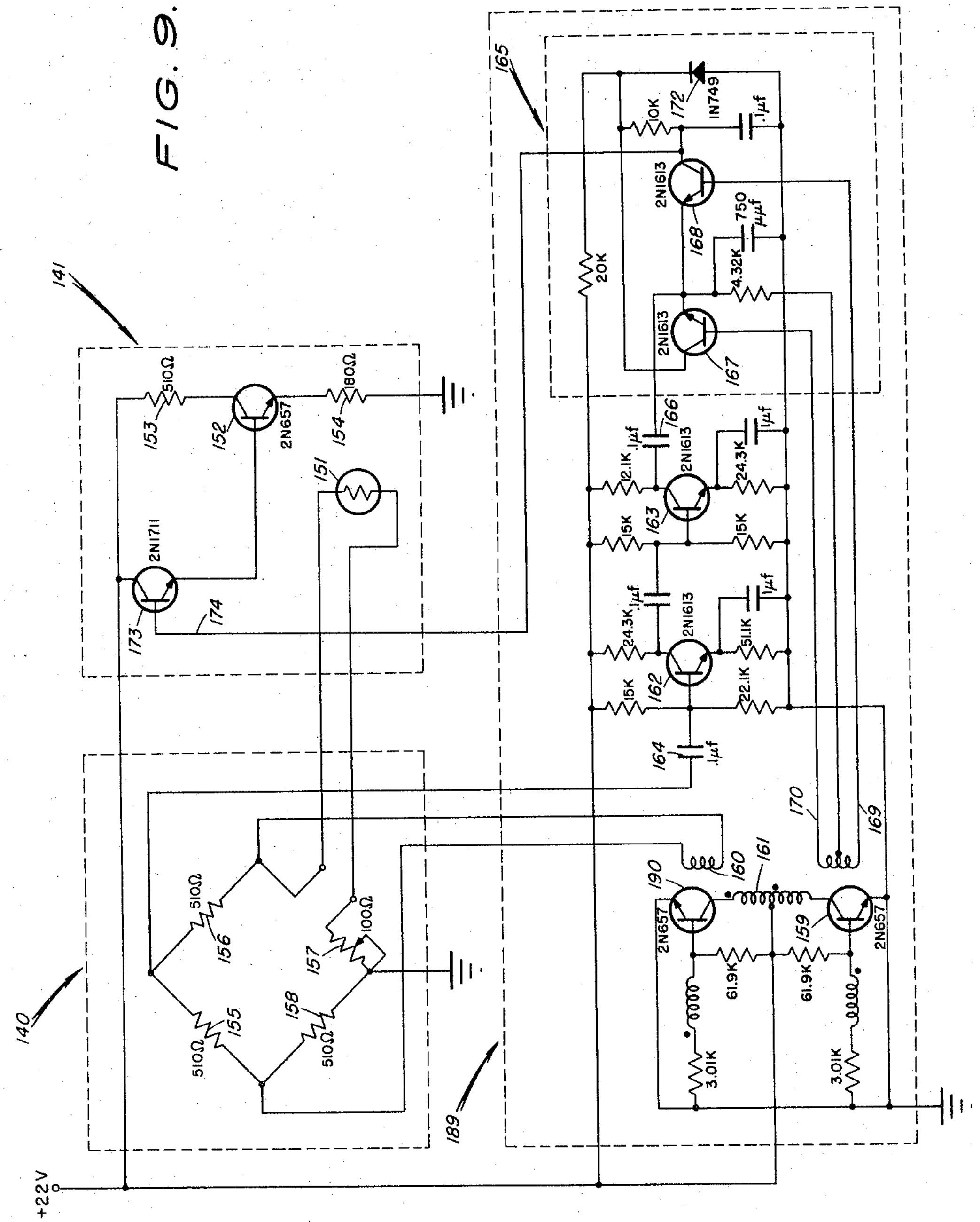

FIG. 3. is a diagram showing the temperature distribution within the various parts of the instant invention;

FIG. 4 is a perspective view of the instant invention showing the screening of its ports;

FIG. 5 is a schematic diagram of the electronics used to control the temperature of the oven and to generate the basic timing frequency utilized in the instant invention;

FIG. 6 is a sectional view of a second embodiment of the instant invention as employed in a proportional type oven;

FIG. 7 is a diagram showing the temperature distribution within the instant invention when utilized with a proportional type oven;

FIG. 8 is a schematic view of the oscillator and amplifier portion of the electronics used in a proportional type oven; and FIG. 9 is a schematic view of the temperature controlling circuit employed with the circuit of FIG. 8.

Briefly, this invention consists of a multi-stage lightweight thermostatically controlled oven, and features the extensive use of a multicasing insulation technique between stages. A thermostat and a heater are employed to control the temperature at a point intermediate the innermost and outermost stages. For those portions of he oven that are not in the immediate neighborhood of the crystal, thermal resistance is of relatively greater importance than capacitance in providing temperature stability. Consequently, the outstanding thermal resistance properties of the multicasing technique are utilized between stages. In this technique a plurality of continuous thermally reflective casings are individually separated by a continuously thermally non-conductive casing.

A high value of thermal capacitance is needed in the immediate neighborhood of the crystal, and is provided by enclosing the crystal within a mass having a high thermal capacity per unit volume. The combination of a container of high thermal capacity and insulation of high thermal resistance acts as a thermal analogue of a low pass filter, and attenuates the temperature hysteresis of the thermostat before the temperature change affects the innermost thermally capacitive container. Additionally, a second layer of thermal resistance encloses the thermostat and the heater, thereby reducing radial heat flow.

Figure 1:
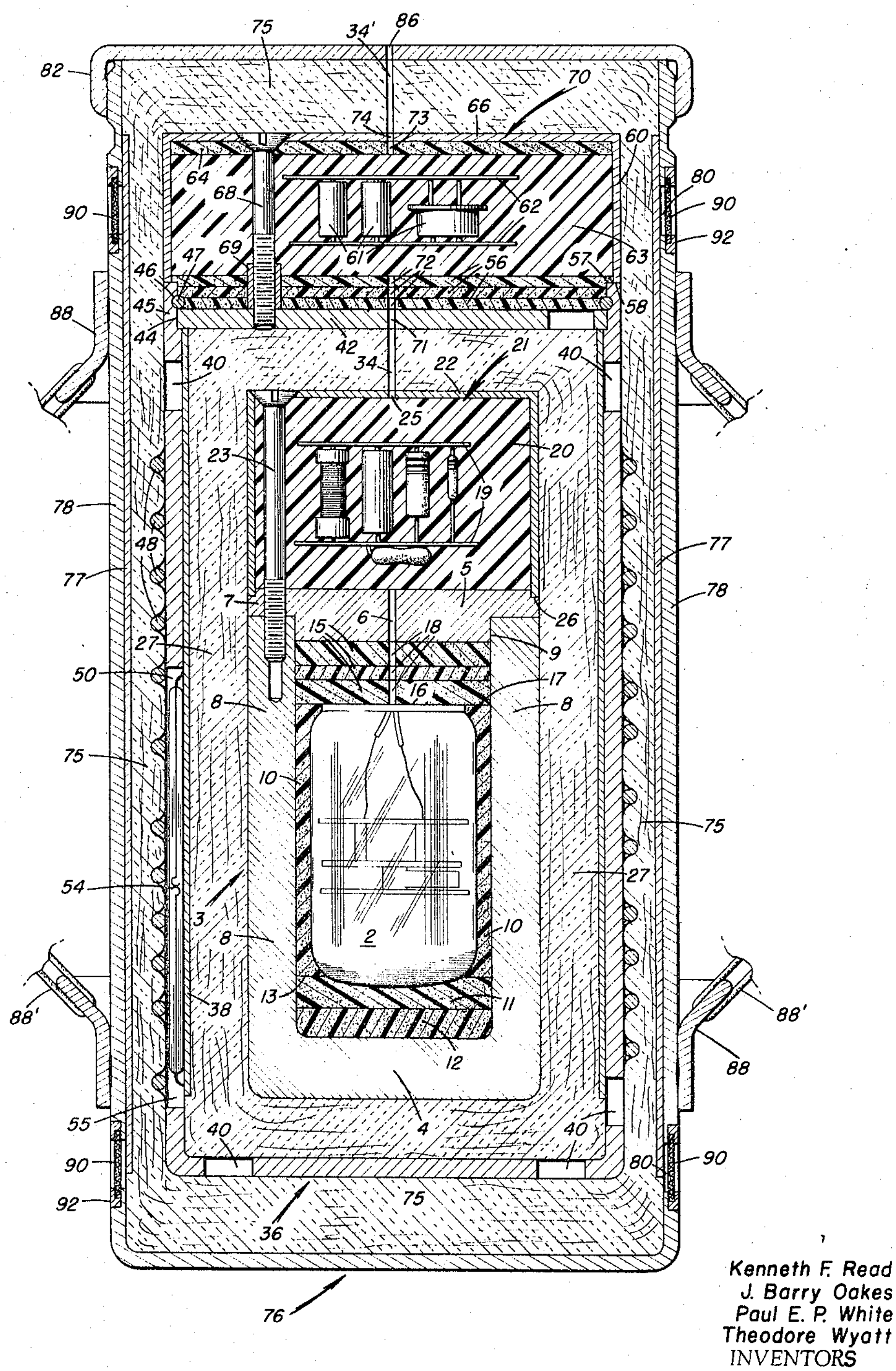
FIG. 1 is a sectional view of the invention.

Referring to FIG. 1, there can be seen a crystal 2 positioned toward the center of the instant invention. The crystal 2 is positioned in a cylindrical Monel or aluminum crystal container 3, which container is formed with a bottom wall 4 and is equipped with a removable cover 5. Two or more crystals can be placed within the inner container 3, and with the addition of duplicate control and oscillator circuits, which circuits are shown in FIG. 5, a standby crystal oscillator may be provided.

The cover 5 is formed with a central hole 6, and an integral outer flange 7, which flange rests upon the upper end of a cylindrically shaped side wall 8 of the container 3, and limits the extent of the insertion of a cylindrically shaped central portion 9 of the cover 5 into the interior of the container 3. The container is thermally capacitive and maintains a constant temperature setting for the crystal 2.

Insulation within the container 3 includes a rectangular piece of silicone sponge 10 wrapped around the outside of the cylindrical and fitted to cover the entire cylindrical area of the crystal 2, and a pair of lower silicone sponge wafers 11 and 12 placed intermediate the crystal 2 and the end portion 13 of the insulation 10, and the bottom wall 4 of the container 3. The insulation within the container 3 further includes a plurality of top silicone sponge insulation wafers 15, which wafers are placed between the top portion 16 of the crystal 2 and the upper end 17 of the insulation 10, and the portion 9 of the cover 5. The insulation wafers 15 are formed with holes 18 aligned with the central hole 6, which holes are used to pass a pair of Nichrome lead wires, not shown, from the crystal 2 to electronic circuit boards 19.

The boards 19 are embedded in a plastic potting compound 20. A potted oscillator assembly 21 including the boards 19 is enclosed by a cap 22, and is in intimate thermal contact with the cover 5 of the crystal container 3. The cap 22 and the assembly 21 are securely held to the cover 5 by a plurality of screws, one of which is shown at 23. The circuit board 19 carry precision oscillator circuitry 24 which is shown in detail in FIG. 5. By placing this circuit in intimate thermal contact with the temperature controlled container 3, improved stability of operation is obtained.

The aluminum cap 22 is formed with an axial opening 25, and is fitted on a shoulder 26 formed in the cover 5. Tightening the screws 23 insures thermal contact between the assembly 21, the cap 22 and the cover 5, and causes the silicone sponge insulation 10, 11, 12 and 15 to be compressed between the crystal 2 and the container 3, thereby insuring positive thermal contact between the container 3, cover 5, and the crystal 2.

The container 3 and the attached cap 22 are wrapped in a thermally resistive insulation layer 27 using the multicasing technique, wherein each reflective casing is completely shielded from the next by a thermally non-conductive casing, as shown in greater detail in FIG. 2. Considerable care is required in assembling the multicasings of insulation to insure complete isolation between adjacent reflective casings of aluminum or aluminum deposited on Mylar. No casing of aluminum can be in contact with another aluminum casing, since this would provide a direct path for thermal conduction and negate the insulating effect of that casing. Additionally, each reflective casing overlaps, thereby providing a continuous reflective barrier. This insulation is shown in FIG. 2 as a continuous thermally non-conductive sheet 28, which sheet is about 0.008 inch in thickness, and a plurality of thermally reflective sheets 29 of about the same thickness as the sheet 28. End discs of both Fiberglas and aluminum are shown at 30 and 31 respectively. The container 3 and the attached cap 22 are wrapped in one turn of the combined strips 28 and 29. Triangular portions 32 of the reflective sheets 29 are folded over to lie flat on the top of the cap 22, and against the bottom wall 4, and then a reflective disc 31 is mounted to overlie each group of folded portions 32, to form a continuous thermally reflective casing 192. The same procedure is followed with triangular portions 33 of the thermally non-conductive sheet 28 and the non-conductive discs 30 to form a continuous non-conductive casing 193 atop the continuous reflective casing 192. As many such casings 192 and 193 as desired may be made, however, the number chosen depends upon the thermal balance required. The optimum number of reflective casings has been determined to be 16, and the optimum number of non-conductive casings must therefore be 17. The discs 30 and 31 are formed with holes 34, corresponding to the opening 25, which holes allow wires from the circuit boards 19 to pass therethrough.

As best seen in FIG. 1, the insertion of the container 3, the cap 22, and the insulation layer 27 into a cylindrical inner container 36 is facilitated by a split, outward flexing, open ended cylinder 38 which is placed around the inner multisheet insulation layer 27. The inner thin-walled container 36 is formed with a plurality of ports 40, which ports establish an absolute vacuum condition within said container, when it is locaetd in a space environment. The container 36 is equipped with a lid 42 which rests upon a shoulder 44 of the container 36. Additionally, the container 36 has an integral wall 45, which wall is 0.06 inch thick and is formed with a groove 46 for receiving a retaining spring 47. The container 36 also has a plurality of turns of a heater wire 48 wound around its outer surface, only a few of said turns being shown for purposes of clarity. Additionally, the container 36 is formed with a narrow slot 50 longitudinally placed within its side wall 45 for receiving a mercury column thermostat 54. The thermostat 54 is embedded in a silver loaded epoxy 55, and, as shown in FIG. 5, is electrically connected to an unregulated voltage source 194 and the heater wire 48. The epoxy 55 insures close thermal contact between the thermostat 54 and the wall 45. Since the thermal time constant for the thermostat 54 is low as compared to the thermal time constant of the wall 45, the effect of the heater wire 48 passing directly over the thermostat is negligible, and the thermostat 54 senses only a temperature change in the wall 45.

A plurality of silicone sponge insulating discs 56 is positioned upon the cover 42, which discs are fitted to lie snugly against a portion 57 of the wall 45, the retaining spring 47, and an inner portion 58 of a second cap 60.

A plurality of electronic components 61 is mounted on a pair of circuit boards 62, and the components and the boards are both embedded in a plastic potting compound 63, and are enclosed by the cap 60. An additional silicone sponge insulating disc 64 is placed between the plastic potting compound 63 and the top wall 66 of the cap 60. A plurality of screws 68, only one of which is shown, each having a protective sleeve 69, securely fastens a circuit board assembly 70 to the lid 42 of the intermediate cylinder 36, said assembly 70 comprising the cap 60, the components 61, the boards 62, the compound 63, and the insulation disc 64.

The lid 42, and the plurality of insulating discs 56 are formed with aligned holes 71 and 72, respectively, for the passage of wires, not shown, from the circuit boards 19 to the second circuit boards 62. Additionally, the silicone sponge disc 64 and the integral top 66 are formed with aligned holes 73 and 74, respectively, for the passage of wires, not shown, from the second circuit boards 62 to other circuits external to the crystal oven.

The multicasing insulation layer technique is again used to enclose the inner container 36 and the assembly 70 with a second resistive insulation layer 75, and to form an outer assembly 76. A split, outward flexing, open ended cylinder 77 is used to insert the assembly 76 into an outer container 78 of the assembly 76 without damage to the insulation layer 75. The insulation layer 75 maintains the heater power and thermostat set point within acceptable levels by reducing the amount of heat passing radially outward from the container 36. The selected thermostat set point lies on the zero slope on the frequency versus temperature curve of the particular crystal employed.

The optimum number of thermally reflective casings for the insulation layer 75 has been determined to be 10, and the optimum number of thermally non-conductive casings is 11. The ideal thermal time constant for a crystal oscillator oven would be infinity, but this is unobtainable. However, by using the thermally resistive properties of the multicasing layers 27 and 75 and the thermally capacitive properties of the innermost container 3, it is possible to obtain a maximum thermal time constant of 32 hours for the instant invention. Obviously, the mass of the container 3 may be either increased or decreased and the time constant will be unchanged as long as a suitable change is made in the number of casings 192 and 193 employed in the insulation layers 27 and 75. The container 3, shown in FIG. 1, weighs approximately 0.34 lb.

The circuit boards 62 carry the precision voltage regulator and buffer amplifier circuit 117, and heater control circuit 119, which circuits are shown in detail in FIG. 5. By placing these circuits within the resistive insulation layer 75, improved regulation of the voltages delivered to the oscillator circuit 24 on the boards 19 is obtained. The operating temperature of the regulator itself is not affected by the voltage supplied from an external course regulator, which regulator is not shown, since increased wattage dissipation in the precision regulator merely causes the thermostat 54 to adjust the heater duty cycle to a lower value.

The outer container 78 is formed with a plurality of ports 80, which ports permit the establishment of a vacuum condition within the container 78. The container 78 is also equipped with a snap-on lid 82 which is formed with a central hole 86 in alignment with holes 34' in the insulation 75 for the passage of wires, not shown, from the circuit boards 62 to points outside of the container 78. Additionally, the container 78 has a pair of opposed flanges 88 mounted on its outer periphery near its opposite ends for mounting the oven within a satellite. The flanges 88 are each formed with an opening to receive a lace 88', the laces being used to secure the oven to a satellite, in the manner shown in U.S. Patent No. 3,043,644 to F. H. Esch. The ports 80 are covered with screens 90, as shown in FIGS 1 and 4, which screens are mounted in ports 92 in a circular band 94 and welded to the container 78 at 96. The screens eliminate R.F. radiation of the crystal-generated frequency and interference caused thereby.

FIG. 3 shows the temperature distribution of a typical crystal oscillator oven for use in an orbiting satellite, which satellite has an outer temperature of approximately +70° F., and whose operating temperature is set for +150° F. Obviously, the lower temperature value may vary between limits of +30° F. and +90° F. without impairment to the operation of the crystal oscillator. The oven automatically adjusts its operation to compensate for various levels of satellite temperature by increasing or decreasing the heater duty cycle.

FIG. 3 also shows the structure which corresponds to the temperature distribution. There is a linear temperature distribution in the insulation layer 75, which layer is placed between the wall 45 of the inner container 36 and the outer container 78; however, the temperature distribution of the insulation layer 27 is quite different. The layer 27 comprises one of three heat leak paths from the metallic container 3, the other two being the conductive path through the electrical leads, and the radiative path through the hole 34 in the layer 27. The temperature variation within the layer 27 is attenuated in logarithmic manner with radial distance, due to the distributed thermal capacity of the insulation material employed.

FIG. 5 shows the electronic circuitry used to generate a precision 3 megacycle signal and to control the operation of the thermostat 54. The circuitry employed is an improved design of a Colpitts oscillator, and therefore needs no detailed description. However, in operation, the active element is a transistor 103. An inductor 104 and capacitors 105, 106, and 107 provide the phase shifting tank network required to produce oscillations. The inductor 104 consists of 29 turns of number 30 copper wire on a coil form number 20753 manufactured by The Cambridge Thermionic Co. The crystal 2 is that identified as Model No. BG 73–A, manufactured by Bliley Electric Co. A capacitor 109 allows adjustment of the tank circuit to the series resonant frequency of the quartz crystal 2, which crystal is connected between the emitter of the transistor 103 and the tank circuit capacity tap point at the junction of the capacitors 106 and 107. Additionally, the capacitor 109 allows the frequency of the crystal to be pulled slightly to either side of the series resonance, if such adjustment is desirable. A silicon diode 110 is used to limit the voltage swing across the oscillator tank circuit and thus control the crystal drive level. In the instant invention, the ratio between the value of the capacitor 109 and the value of the capacitor 107 is adjusted to provide approximately a 2 volts peak-to-peak swing at the base of the transistor 103 in the absence of the diode 110. Then, with the diode 110 introduced into the circuit, the voltage swing is reduced to twice the voltage required to cause diode conduction, or about 1.4 volts peak-to-peak. In this manner, considerable variation in supply voltage or in transistor characteristics can be tolerated without any perceptible change in crystal drive level. Additionally, by the use of these circuits, the heat dissipation is kept low and at a constant level, so that the average temperature within the insulation layer 27 does not exceed that of the container 36 by an appreciable amount.

The 3 megacycle output is taken from the low impedance emitter point of the transistor 103 and is carried by a decoupling capacitor 111 and by a number 36 Nichrome wire conductor 125, to a two-stage isolation amplifier 112, consisting of a pair of transistors 113 and 114. A pair of resistors 115 and 116 provide feedback to the transistors 113 and 114, which feedback tends to raise the input impedance, lower the output impedance, and stabilize the gain of the two-stage amplifier. Additionally, a variation of the value of the resistor 116 allows adjustment of the output level to a suitable voltage value, for example to a 0.5 volt peak-to-peak level.

The two-stage isolation amplifier 112 and a precision transistor voltage regulator 118, and a transistor heater control 119 are located on circuit boards 62. These circuits undergo a temperature variation equal to the hysteresis of the thermostat 54, which hysteresis is 1° F. or less. The relatively constant environment within the container 36 provides excellent temperature regulation for a reference Zener diode 120, and the voltage regulator transistor 121, which together determine the regulated supply voltage for the oscillator and amplifier circuitry. A pre-regulator transistor circuit 122 is located within the main satellite power supply, and is used to reduce power supply variations to an acceptable level for the precision regulator 118. A plurality of Nichrome wires are used in the oven as signal leads having low thermal conductive properties, and are all indicated at 125.

A suitable thermostat for operating with a 1° F. hysteresis is that identified as Model No. AA20231120 manufactured by the Vap-Air Thermostat Co. A second thermostat which can be employed in the instant invention, and which has a hysteresis of 0.1° F. is that identified as Model TPS .008 manufactured by the Vap-Air Thermostat Co. However, when the second thermostat is used the number of insulation casings in the layers 27 and 75 remain respectively 16 casings of aluminum or aluminized Mylar and 17 casings of Fiberglas paper, and 10 casings of aluminum or aluminized Mylar and 11 casings of Fiberglas paper.

FIG. 8 shows a second embodiment of the electronic circuitry which is employed in conjunction with the instant invention. The oscillator circuitry 126 consists of a transistor 127, a crystal 2′, and associated tank circuit components. The circuit shown is of the Colpitts type, with the 5 megacycle fifth overtone crystal 2′ placed in series with the tank inductance 129. A suitable crystal is that identified as Model No. BG61AH-5, manufactured by the Bliley Electric Co. A crystal of this type will tend to oscillate at one of its lower overtones unless precautions are taken to prevent it. An inductor 130 and a capacitor 131 form a parellel tuned circuit 132, which circuit is resonant at above 3.5 megacycles, and has a net capacitive reactance at 1 megacycle and 3 megacycles sufficient to prevent oscillations.

The output of the transistor 127 is coupled to a two-stage feedback stabilized amplifier 134, which amplifier consists of a pair of transistors 135 and 136. The output of the transistor 136 is coupled to external circuits through an impedance stepdown transformer 137.

As shown in FIG. 6, the oscillator circuitry 126, the amplifier 134, an automatic gain control detector 139, and a temperature sensing bridge 140, with its D.C. amplifier 141, are mounted on circuit boards 142 in intimate thermal contact with a thermally capacitive aluminum container 143 and the crystal 2′. The container 143 is formed with a bottom wall 144 and a cylindrical side wall 145. The crystal 2′ and the circuit boards 142 are electrically connected together, and are separately embedded in plastic potting compounds 146 and 147, respectively. The container 143 is equipped with a circular cover 149, which cover is held in place by a plurality of screws 150, only one of which is shown. Additionally, the container 143 carries a thermistor 151 in its side wall 145, and a power transistor 152, with its biasing resistors 153 and 154 (FIG. 9) in its bottom wall 144. The electrical interconnections of the thermistor 151, and the power transistor 152 may be seen by referring to FIG. 9. The thermistor 151 senses a temperature change and causes the power transistor 152 to dissipate more heat. The remaining circuitry, also shown in FIG. 9, consisting of an oven temperature control circuit 189, is placed elsewhere in the satellite, and need not be thermally stabilized within the container 143.

Temperature sensing is accomplished in the bridge 140, which bridge consists of four temperature stable resistors 155, 156, 157, and 158, and the temperature sensitive thermistor 151. The resistor 157 is adjustable to allow the birdge 140 to be balanced at the required set temperature. The bridge 140 is excited with a 5 kc. square wave signal generated by a transformer coupled multivibrator consisting of a pair of transistors 190 and 159. The amplitude of the square wave developed across a winding 160 of a transformer 161 is small enough so that the self-heating effect in the thermistor 151 is minimized.

The output of the bridge 140 is applied to a two-stage A.C. amplifier, consisting of a pair of transistors 162 and 163, by means of a coupling capacitor 164. The input signal is a square wave having an amplitude proportional to bridge unbalance and a phase relationship with respect to that of the driving source of either 0° or 180°, depending whether the bridge is unbalanced in the positive or negative temperature direction. The output of the transistor 163 is applied to a phase sensitive detector 165 through a capacitor 166, which detector includes a pair of transistors 167 and 168. A reference square wave signal from the transformer 161 is also applied to the detector 165 by lines 169 and 170. The resulting D.C. signal at the collector of the transistor 168 has a discriminator-like characteristic, that is, it has a positive value compared to the reference D.C. voltage across a diode 172 if the temperature of the container 143 is too low, and a negative value if the temperature of the container 143 is too high. This D.C. signal across the diode 172 is applied to a transistor 173 by a line 174, which transistor 173, in combination with the transistor 152, comprises a Darlington-connected current amplifier. The power dissipation in the transistor 152, and in the resistors 153 and 154, depends on the bridge unbalance, which unbalance arises from a temperature difference. Therefore, since the power transistor is located within the bottom wall 144 of the container 143, power dissipation by this transistor raises the temperature of the container.

The container 143 is enclosed by a multi-layer insulation layer 178 in the manner shown in FIG. 2. The layer 178 comprises 16 casings of aluminum foil and 17 casings of Fiberglas paper. A split cylinder 179 is also used to insert the insulation layer 178, with the container 143 therein, into an outer container 280. The outer container 180 is formed with a plurality of ports 182, and is equipped with a snap-on top 184 and a pair of mounting flanges 185.

FIG. 7 shows the temperature distribution within the various parts of the crystal oscillator oven shown in FIG. 6. It can be seen at a glance that the temperature curve appears to have no hysteresis loop similar to the curve shown in FIG. 3. However, a hysteresis loop does exist but is too small to show, since the temperature deviation of the container 143 is maintained within ±0.0005 degree of the set temperature, and is determined by the gain of the amplifier 142.

Obviously many modifications and variations of the present invention are possible in the light of the above teachings. It is therefore to be understood that within the scope of the appended claims the invention may be practiced otherwise than as specifically described.

What is claimed is:

1. An oscillator oven for use in a space environment, comprising, (a) a thermally capacitive container, (b) a crystal oscillator in the container, (c) an insulative casing surrounding said thermally capacitive container and including spaced, alternately arranged thermally reflective surfaces and thermally non-conductive surfaces, (d) an outer container having a plurality of ports and enclosing said casing and said first-mentioned container, and (e) means for facilitating the insertion of the casing, said first-mentioned container, and said crystal oscillator into the outer container.

2. A temperature controlled oscillator oven as recited in claim 1, wherein said last-mentioned means comprises a split cylinder movable to a position between the casing and said outer container.

3. The structure recited in claim 1, wherein said thermally capacitive container includes a bottom wall and a cover, and wherein said casing includes, a rectangular sheet of aluminum foil formed with integral triangular portions, said rectangular sheet being wrapped around the capacitive container and said triangular portions being folded to lie on the cover and against the bottom wall of said container, a disc of foil overlying said folded triangular portions on said cover, and a disc of foil overlying the triangular portions against said bottom wall.

4. The structure recited in claim 1, wherein said thermally capacitative container includes a bottom wall and a cover, and said casing includes,
an aluminum-coated rectangular sheet of thermoplastic material formed with integral triangular portions,
said rectangular sheet being wrapped about said capacitive container, certain of said triangular portions being folded to lie on said cover and certain other of said triangular portions being folded against said bottom wall of said container, and
discs of thermoplastic formed with an aluminum coating, one of said discs being placed over said folded triangular portions on the cover and another of said discs being placed to lie outwardly of the triangular portions against the bottom wall.

5. The structure as recited in claim 1, wherein said thermally capacitive container includes a bottom wall and a cover, and said casing includes,
a rectangular sheet of Fiberglas formed with integral triangular portions,
said rectangular sheet being wrapped about said thermally capacitive container, a group of said triangular portions being folded to lie on said cover and another group of said triangular portions being folded to lie against said bottom wall of said container, and
a disc of Fiberglas covering each group of said folded triangular portions.

6. In a device for temperature stabilizing a crystal oscillator in a space environment,
a thermally capacitive container having a side wall, a cover and an integral bottom wall,
crystal oscillator circuit components mounted on said cover,
a first insulative casing surrounding said thermally capacitive container and including spaced, alternately arranged thermally reflective surfaces and thermally non-conductive surfaces,
an inner container surrounding said first insulative casing and having a plurality of ports,
means for heating said inner container to a preset temperature,
a second insulative casing surrounding said inner container and including spaced, alternately arranged thermally reflective surfaces and thermally non-conductive surfaces, and
an outer container having a plurality of ports and receiving said first-mentioned container and said inner container.

7. A temperature stabilizing device as recited in claim 6, which further includes
a first split cylinder disposed intermediate said first insulative casing and said inner container, and
a second split cylinder disposed intermediate said second resistive layer and said outer container.

8. The structure of claim 6, and further including
a voltage source,
said outer container being provided with a plurality of ports,
said inner container being provided with a plurality of ports and a slot, and
a thermostat in said slot and having a non-grounded terminal and a grounded terminal,
said voltage source and said thermostat being electrically connected to said heating means.

9. A temperature stabilizing device as recited in claim 8, wherein said crystal oscillator circuit components comprises:
a transistor having a base lead, a collector lead and an emitter lead,
said emitter lead being connected to the grounded terminal of said thermostat,
said base lead being connected directly to the non-grounded terminal of said thermostat and electrically to said voltage source, and
said collector lead being connected to said heating means.

References Cited by the Examiner

UNITED STATES PATENTS

| | | | |
|---|---|---|---|
| 2,791,706 | 5/1957 | Font | 310—8.9 |
| 2,973,420 | 2/1961 | Craiglow et al. | 310—8.9 |
| 3,007,023 | 10/1961 | Johnston et al. | 310—8.9 |
| 3,028,473 | 4/1962 | Dyer et al. | 310—8.9 |
| 3,068,338 | 12/1962 | Bigler | 219—501 |

WILTON O. HIRSHFIELD, *Primary Examiner.*

J. D. MILLER, *Assistant Examiner.*